United States Patent [19]

Yatka et al.

[11] Patent Number: 5,039,530

[45] Date of Patent: Aug. 13, 1991

[54] STORAGE STABLE CHEWING GUM CONTAINING ALITAME

[75] Inventors: Robert J. Yatka, Orland Park; Mansukh M. Patel, Downers Grove, both of Ill.

[73] Assignee: Wm. Wrigley Jr. Company, Chicago, Ill.

[21] Appl. No.: 487,744

[22] Filed: Mar. 1, 1990

[63] Continuation-in-part of PCT/US89/01269, Mar. 28, 1989.

[51] Int. Cl.$^5$ ............................................. A23G 3/30
[52] U.S. Cl. ........................................ 426/3; 426/548; 426/804
[58] Field of Search ................................. 426/3–6, 426/548, 804

[56] References Cited

U.S. PATENT DOCUMENTS

| | | | |
|---|---|---|---|
| 3,955,000 | 5/1976 | Baggerly | 426/96 |
| 4,246,286 | 1/1981 | Klose et al. | 426/3 |
| 4,384,004 | 5/1983 | Cea et al. | 426/3 |
| 4,411,925 | 10/1983 | Brennan et al. | 426/548 X |
| 4,517,379 | 5/1985 | Brennan et al. | 426/548 |
| 4,536,396 | 8/1985 | Stephens et al. | 426/3 X |
| 4,556,565 | 12/1985 | Arima et al. | 426/3 |
| 4,792,453 | 12/1988 | Reed et al. | 426/5 |
| 4,806,364 | 2/1989 | Kabota et al. | 426/5 |
| 4,863,745 | 9/1989 | Zibell | 426/5 |
| 4,889,726 | 12/1989 | Dave et al. | 426/3 |
| 4,889,727 | 12/1989 | Dave et al. | 426/3 |
| 4,902,519 | 2/1990 | Ream et al. | 426/91 |
| 4,904,482 | 2/1990 | Patel et al. | 426/3 |
| 4,931,295 | 6/1990 | Courtright et al. | 426/5 |

FOREIGN PATENT DOCUMENTS

| | | |
|---|---|---|
| 0320522 | 6/1989 | European Pat. Off. . |
| 0320523 | 6/1989 | European Pat. Off. . |
| 0354680 | 2/1990 | European Pat. Off. . |
| 83-198250 | 11/1983 | Japan . |
| WO90/06061 | 6/1989 | PCT Int'l Appl. . |

OTHER PUBLICATIONS

Pfizer brochure entitled "Alitame—A New High-Intensity Sweetener, Technical Summary, 1987".
Brochure entitled, "Alitame-A New High-Intensity Sweetener, Technical Summary, 1987".

*Primary Examiner*—Jeanette Hunter
*Attorney, Agent, or Firm*—Willian Brinks Olds Hofer Gilson & Lione

[57] ABSTRACT

A storage stable chewing gum incorporating Alitame as a sweetener is disclosed. The gum contains from about 0.005% to about 0.2% Alitame. In one embodiment, the gum is substantially free of wax. In another embodiment, the gum contains talc as a filler and is substantially free of calcium carbonate. Samples of gum according to the present invention are shown to retain, after eight weeks of storage at 85° F., a percentage of Alitame originally present in the gum of at least 20% more than would have remained otherwise.

7 Claims, No Drawings

STORAGE STABLE CHEWING GUM CONTAINING ALITAME

CROSS REFERENCE TO RELATED APPLICATION

This application is a continuation-in-part of Application Ser. No. PCT/US89/01269, filed Mar. 28, 1989, incorporated herein by reference.

BACKGROUND OF THE INVENTION

This invention relates to chewing gum compositions which incorporate Alitame. Particularly, the invention relates to storage stable gum compositions wherein the Alitame does not undergo degradation sufficient to cause it to loose its sweetening effects.

Alitame is a new, high intensity dipeptide sweetener developed by Pfizer Corporation of Groton, Conn.

The chemical name for Alitame is L-α-Aspartyl-N-(2,2,4,4-tetramethyl-3-thietanyl)-D-alaninamide hydrate. A Food Additive Petition has been filed by Pfizer for use of Alitame as a sweetener. Alitame is patented by Pfizer under U.S. Pat. No. 4,411,925. This patent shows the use of Alitame with a sweetening agent like sorbitol or corn syrup in an amount to sweeten edible products, including chewing gum. The patent also discloses that Alitame is approximately 2000 times sweeter than sucrose, advantageously making it sweeter than aspartame, which is only up to 200 times sweeter than sucrose. Therefore, it is estimated that Alitame is about 10 times sweeter than aspartame.

Alitame is similar to aspartame in that both are aspartic acid based sweeteners. However, Alitame has been shown to be much more stable than aspartame in aqueous solutions, and was therefore expected to be much more stable in chewing gum.

Particularly, Alitame has been found to be much more stable in buffer solutions at pH's of 5 and above, whereas aspartame's stability is greatest in the pH ranges of 3 to 5, and decreases with increasing pH.

For that reason, several schemes for increasing aspartame stability in chewing gum have been directed to maintaining the pH in optimum levels. For example, U.S. Pat. No. 4,246,286 discloses chewing gum sweetened by aspartame wherein the gum has a pH of between 5.0 and 7.0. To attain this, the gum base for use in the patented gum is free of normally-used calcium carbonate fillers. Non-basic fillers such as magnesium silicate or high levels of wax are suggested as substitutes.

U.S. Pat. No. 4,556,565 also suggests avoidance of calcium carbonate in a base for a gum sweetened with aspartame. However, the patent also states that talc (magnesium silicate) "is not desired for use as an ingredient in chewing gum because of its potential hazard to the human body." This patent suggests the use of microcrystalline cellulose powder as a filler. The suggested gum bases used also include 5% or 10% wax.

Since Alitame is more stable at higher pH's than aspartame, it would be thought that the avoidance of basic fillers such as calcium carbonate would not be necessary to improve the stability of Alitame in chewing gum. Also, there was no consideration that other common chewing gum ingredients, such as wax, would have an adverse impact on Alitame stability. However, as described herein, very unexpected results came from various tests of gum formulations containing Alitame.

SUMMARY OF THE INVENTION

Storage-stable chewing gums containing Alitame have been discovered. In one embodiment, the gum comprises Alitame in an amount from about 0.005% to about 0.2% by weight of the gum and the gum is substantially free of wax. In another embodiment, the gum is substantially free of calcium carbonate and contains from about 1% to about 10% talc. It has been found that wax causes degradation of the Alitame, and that in gums that contain wax, replacing the calcium carbonate with talc improves the Alitame stability. Gums of the present invention are storage stable in that, after eight weeks of storage at 85° F., the percentage of the originally present Alitame remaining in the gum is at least 20% greater than the percentage which would have remained had the gum not been formulated taking into account these considerations.

DETAILED DESCRIPTION OF THE INVENTION AND PREFERRED EMBODIMENTS

As used herein, the term chewing gum includes all types of gum compositions, including chewing gum, bubble gum and the like.

All percents used herein are weight percents unless otherwise specified.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. However, as discussed herein, waxes are generally excluded from gums of the present invention. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. If wax is used in the gum, the preferred filler is talc, and calcium carbonate should be excluded. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers.

The water-soluble portion of the chewing gum contains a bulking and sweetening agent. In sugar gums, the bulking and sweetening agent is the same, sucrose. In sugarless gums, the bulking and sweetening agents usually include sorbitol and high potency sweeteners like aspartame or, in the case of the present invention, Alitame. The bulking and sweetening agents usually comprise from about 30 to about 90 percent of the gum composition, and preferably about 50 to about 80 percent.

The water-soluble portion of the chewing gum may further comprise softeners, other sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. Preferred embodiments of the invention, however, take into account related discoveries regarding the stability of Alitame with other ingredients, as discussed below and in U.S. patent application Ser. No. 07/487,760, entitled "Improved Alitame Stability Using Hydrogenated Starch Hydrolysate Syrups" filed on Mar. 1, 1990 and incorporated herein by reference.

The flavor agent used in the gum may be present in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention. However, some flavors may cause degradation of the Alitame. See U.S. patent application Ser. No. 7/458,989, entitled "Improved Alitame Stability In Chewing Gum By Encapsulation", filed Dec. 29, 1989, incorporated herein by reference. Therefore, when producing storage stable gums sweetened with unencapsulated Alitame, flavors should be used which do not cause Alitame degradation.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding, it to the running mixer. The base may also be melted in the mixer itself. Color or emulsifiers may also be added at this time. A softener may also be added at this time, along with any syrup used and a portion of the bulking agent. Further portions of the bulking agent may then be added to the mixer. The flavoring agent is typically added with the final portion of the bulking agent. The entire mixing procedure typically takes from five to fifteen minutes, but longer mixing times may sometimes be required.

Test 1 (Samples 1-6)

The following base formulas were used to produce the following sugarfree gum formulas:

| Base % | | | Gum % |
|---|---|---|---|
| Wax | 10.0 | Base | 25.5 |
| Elastomer | 16.7 | Sorbitol | 49.5 |
| PVAc | 15.3 | Lecithin | 0.2 |
| Resins | 19.1 | Mannitol | 8.0 |
| Fats | 18.3 | Lycasin | 6.8 |
| Filler | 20.6 | Glycerin | 8.6 |
| | 100 | Peppermint Flavor | 1.4 |
| | | | 100 |

In Samples 1-3, the filler used in the base was calcium carbonate. In Samples 4-6, the base was made with talc (magnesium silicate). Samples 1 and 4 further contained 0.02% Alitame. Samples 2 and 5 further contained 0.03% Alitame, and samples 3 and 6 further contained 0.04% Alitame. All samples were stored at 85° F. for up to 8 weeks and were then analyzed for Alitame degradation. Results are shown in Table I.

TABLE I

EFFECTS OF FILLER (TALC OR CALCIUM CARBONATE) USED IN BASE ON ALITAME STABILITY
% Of Original Alitame Remaining

| 0.02% Alitame Level | | | |
|---|---|---|---|
| | Sample 1 (CaCO$_3$) | Sample 4 (Talc) | Difference | % Increase Difference/% in Sample 1 |
| Week 1 | 81 | 89 | +8 | 10% |
| Week 2 | 62 | 78 | +16 | 26% |
| Week 3 | 56 | 67 | +11 | 20% |
| Week 4 | 44 | 56 | +12 | 27% |
| Week 6 | 37 | 50 | +13 | 35% |
| Week 8 | 25 | 35 | +10 | 40% |
| | | | | Average = 26.3% Increase |

| 0.03% Alitame Level | | | |
|---|---|---|---|
| | Sample 2 (CaCO$_3$) | Sample 5 (Talc) | Difference | % Increase Difference/% in Sample 2 |
| Week 1 | 81 | 93 | +12 | 15% |
| Week 2 | 53 | 82 | +29 | 55% |
| Week 4 | 44 | 60 | +16 | 36% |
| Week 8 | 28 | 46 | +18 | 64% |
| | | | | Average = 42.5% Increase |

TABLE I-continued

EFFECTS OF FILLER (TALC OR CALCIUM CARBONATE)
USED IN BASE ON ALITAME STABILITY
% Of Original Alitame Remaining

| | 0.04% Alitame Level | | | |
|---|---|---|---|---|
| | Sample 3 (CaCO$_3$) | Sample 6 (Talc) | Difference | % Increase Difference/% in Sample 3 |
| Week 1 | 91 | 89 | −2 | −2% |
| Week 2 | 79 | 83 | +4 | 5% |
| Week 3 | 65 | 69 | +4 | 6% |
| Week 4 | 56 | 60 | +4 | 7% |
| Week 6 | 50 | 60 | +10 | 20% |
| Week 8 | 33 | 43 | +10 | 30% |
| | | | | Average = 11% Increase |

The data shows that at the same level of filler, Alitame is more stable when talc is used as the base filler. The increase in stability in comparable formulas was 26%, 42%, and 11% respectively for samples containing 0.02%, 0.03% and 0.04% Alitame.

Previous studies had suggested that waxes may be detrimental to Alitame stability. For example, see Table II and the related discussion in U.S. patent application Ser. No. 7/458,989, entitled "Improved Alitame Stability In Chewing Gum By Encapsulation" filed Dec. 29, 1989. Therefore, additional tests were run to determine the effect of wax and the filler used in the gum base.

Test 2 —Samples 7-18

Three new base formulas were prepared. Each had a calcium carbonate version and a talc version. One was the same formulation as Samples 1-6. The base formulas for the samples were as follows:

| | Samples 7-10 | Samples 11-14 | Samples 15-18 |
|---|---|---|---|
| Wax | 10.0 | 0.0 | 8.5 |
| Elastomer | 16.7 | 25.9 | 11.1 |
| PVAc | 15.3 | 21.7 | 18.0 |
| Resins | 19.1 | 0.0 | 22.9 |
| Fats | 18.3 | 39.1 | 20.9 |
| Filler | 20.6 | 13.3 | 19.6 |
| | 100 | 100 | 100 |

Samples 7-8, 11-12 and 15-16 had a base made with calcium carbonate filler and Samples 9-10, 13-14 and 17-18 had a talc filler in the base. Sugarless gum was made according to the gum formula used in Samples 1-6. Further, odd numbered samples (7, 9, 11, 13, 15 and 17), contained Alitame at a level of 0.02%. Even numbered samples (8, 10, 12, 14, 16 and 18) contained Alitame at a level of 0.04%. Again the samples were stored at 85° F. for up to 8 weeks and were analyzed for Alitame degradation. Results are shown in Table II.

TABLE II

EFFECT OF BASE INGREDIENTS ON ALITAME STABILITY
PERCENT OF ORIGINAL ALITAME REMAINING

| | 0.02% Alitame | | | | 0.04% Alitame | | | |
|---|---|---|---|---|---|---|---|---|
| | (CaCO$_3$) | (Talc) | Diff. | % Inc. | (CaCO$_3$) | (Talc) | Diff. | % Inc. |
| | 10% Wax Level in Base | | | | | | | |
| | Sample 7 | Sample 9 | | | Sample 8 | Sample 10 | | |
| Week 1 | 59 | 76 | +17 | 29% | 67 | 76 | +9 | 13% |
| Week 2 | 41 | 62 | +21 | 51% | 53 | 68 | +15 | 28% |
| Week 4 | 18 | 43 | +25 | 139% | 33 | 50 | +17 | 52% |
| Week 6 | 12 | 29 | +17 | 141% | 22 | 37 | +15 | 68% |
| Week 8 | 6 | 19 | +13 | 217% | 17 | 26 | +11 | 65% |
| | | | Average = 115% Inc. | | | | Average = 45% Inc. | |
| | 0% Wax Level in Base | | | | | | | |
| | Sample 11 | Sample 13 | | | Sample 12 | Sample 14 | | |
| Week 1 | 84 | 81 | −3 | −4% | 89 | 85 | −4 | −4% |
| Week 2 | 68 | 71 | +3 | +4% | 79 | 76 | −3 | −4% |
| Week 4 | 53 | 52 | −1 | −2% | 68 | 66 | −2 | −3% |
| Week 6 | 42 | 43 | +1 | +2% | 58 | 54 | −4 | −7% |
| Week 8 | 37 | 19 | −18 | −49% | 50 | 46 | −4 | −8% |
| | | | Average = −10% Inc. | | | | Average = −5.2% Inc. | |
| | 8.5% Wax Level in Base | | | | | | | |
| | Sample 15 | Sample 17 | | | Sample 16 | Sample 18 | | |
| Week 1 | 81 | 90 | +9 | 11% | 84 | 92 | +8 | 10% |
| Week 2 | 75 | 76 | +1 | 1% | 75 | 84 | +9 | 12% |
| Week 4 | 56 | 62 | +6 | 11% | 56 | 76 | +20 | 36% |
| Week 6 | 44 | 57 | +13 | 30% | 47 | 63 | +16 | 34% |
| Week 8 | 25 | 48 | +23 | 92% | 37 | 53 | +16 | 43% |
| | | | Average = 29% Inc. | | | | Average = 27% Inc. | |

Results showed that the use of talc in place of calcium carbonate in the base in Samples 9 and 10 versus respectively Samples 7 and 8 improved the stability of Alitame by 115% and 45%. Likewise in Samples 17 and 18, versus Samples 15 and 16, Alitame stability was improved with talc base by 29% and 27%. However, in Samples 13 and 14 versus Samples 11 and 12, no stability improvement was noted, as demonstrated by a slight decrease in stability of 10% and 5%. Those bases which contain a significant quantity of wax show that Alitame is stabilized when talc replaces calcium carbonate in the base formula. When a base formula is made without wax, the use of talc in place of calcium carbonate has no effect on Alitame stability.

It is believed that small amounts of wax (2% or less by weight of the base) in gum will not cause degradation of the Alitame.

Examples of one embodiment of the present invention include Samples 4–6, 9–10 and 17–18, in which wax was used in the gum base but talc was used as the filler and the gum was free of calcium carbonate. The preferred example of this embodiment is Sample 5.

Examples of another embodiment of the present invention includes Samples 11–14, where the gum was free of wax. The preferred example of this embodiment is Sample 12.

With gums of these preferred embodiments, at least 40% of the original Alitame formulated in the gum still remained after eight weeks of storage at 85° F.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. A storage-stable chewing gum comprising from about 5% to about 95% of a gum base; about 30% to about 90% of a bulking agent; about 0.1% to about 10% of a flavor agent and Alitame in an amount from about 0.005% to about 0.2% by weight of the gum wherein the gum is substantially free of wax and at least 40% of the original Alitame formulated in the gum remains after eight weeks of storage at 85° F.

2. The chewing gum of claim 1 wherein after eight weeks of storage at 85° F. the percentage of the amount of originally present Alitame remaining in the gum is at least 20% greater than the percentage which would have remained had the gum not been substantially free of wax.

3. The chewing gum of claim 1 wherein the Alitame comprises between about 0.02% and about 0.04% of the gum composition.

4. A storage-stable chewing gum comprising from about 5% to about 95% of a gum base; about 30% to about 90% of a bulking agent; about 0.1% to about 10% of a flavor agent and Alitame in an amount from about 0.005% to about 0.2% of the gum, wherein the gum is substantially free of calcium carbonate and comprises from about 1% to about 10% talc and between about 0.4% and about 4% wax and at least 40% of the original Alitame formulated in the gum remains after eight weeks of storage at 85° F.

5. A storage-stable chewing gum comprising from about 5% to about 95% of a gum base; about 30% to about 90% of a bulking agent; about 0.1% to about 10% of a flavor agent and Alitame in an amount from about 0.005% to about 0.2% of the gum and wherein the gum formulation provides the Alitame with stability such that after eight weeks of storage at 85° F. at least 40% of the originally present Alitame still remains in the gum.

6. The chewing gum of claim 4, wherein the Alitame comprises between about 0.02% and about 0.04% of the gum composition.

7. The chewing gum of claim 5 wherein the Alitame comprises between about 0.02% and about 0.04% of the gum composition.

* * * * *

UNITED STATES PATENT AND TRADEMARK OFFICE
CERTIFICATE OF CORRECTION

PATENT NO. : 5,039,530

DATED : August 13, 1991

INVENTOR(S) : Robert J. Yatka et al.

It is certified that error appears in the above-identified patent and that said Letters Patent is hereby corrected as shown below:

In column 3, line 26, after "Syrups" please insert --,--.

In column 4, line 14, after "adding" please delete ",".

In column 4, line 42, please delete "samples" and substitute therefor --Samples--.

In column 5, line 19, after "11%" please insert --,--; and after "respectfully" please insert --,--.

In column 6, line 27, please delete "bas" and substitute therefor --base--.

In column 6, line 32, after "17)" please delete ",".

In column 7, lines 2 and 3, after "versus" please insert --,--; and after "respectively" please insert --,--.

In column 7, line 24, please delete "includes" and substitute therefor --include--.

UNITED STATES PATENT AND TRADEMARK OFFICE
CERTIFICATE OF CORRECTION

PATENT NO.   : 5,039,530                    Page 2 of 2

DATED        : August 13, 1991

INVENTOR(S)  : Robert J. Yatka et al.

It is certified that error appears in the above-identified patent and that said Letters Patent is hereby corrected as shown below:

Column 9,
    In claim 6, line 1, after "4" please delete ",".

Signed and Sealed this

Sixteenth Day of February, 1993

*Attest:*

STEPHEN G. KUNIN

*Attesting Officer*   Acting Commissioner of Patents and Trademarks